(12) United States Patent
Scholte-Wassink

(10) Patent No.: US 9,574,546 B2
(45) Date of Patent: Feb. 21, 2017

(54) WIND TURBINE ROTOR CONTROL

(75) Inventor: Hartmut Scholte-Wassink, Lage (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1288 days.

(21) Appl. No.: 13/517,868

(22) Filed: Jun. 14, 2012

(65) Prior Publication Data

US 2013/0334817 A1 Dec. 19, 2013

(51) Int. Cl.
*F03D 7/00* (2006.01)
*F03D 7/02* (2006.01)

(52) U.S. Cl.
CPC ............ *F03D 7/0204* (2013.01); *Y02E 10/723* (2013.01)

(58) Field of Classification Search
CPC .... F03D 7/0204; F03D 7/0212; F03D 7/0208; F03D 7/048; F03D 9/005
See application file for complete search history.

(56) References Cited

U.S. PATENT DOCUMENTS

| | | | |
|---|---|---|---|
| 2005/0276696 A1* | 12/2005 | LeMieux | F03D 7/02 416/61 |
| 2009/0099702 A1* | 4/2009 | Vyas | F03D 7/0292 700/287 |
| 2011/0268569 A1 | 11/2011 | Loh et al. | |
| 2012/0128488 A1 | 5/2012 | Kristoffersen | |

FOREIGN PATENT DOCUMENTS

GB 2481461 A 12/2011

OTHER PUBLICATIONS

Office Action issued in connection with corresponding CA Application No. 2,818,019 on Sep. 25, 2014.
Office Action issued in connection with corresponding CA Application No. 2818019 on May 8, 2014.

* cited by examiner

*Primary Examiner* — Eric Keasel
*Assistant Examiner* — Maxime Adjagbe
(74) *Attorney, Agent, or Firm* — GE Global Patent Operation; Douglas D. Zhang

(57) ABSTRACT

A method for operating a wind turbine is provided. The method includes determining a wind condition, determining for the wind condition expected azimuthal positions of a rotating wind rotor of the wind turbine, and determining for the wind condition desired azimuthal positions of the rotating wind rotor so that at least one of a load balance of the rotating wind rotor and a power uptake of the rotating wind rotor is improved compared to the expected azimuthal positions.

19 Claims, 7 Drawing Sheets

US 9,574,546 B2

WIND TURBINE ROTOR CONTROL

BACKGROUND OF THE INVENTION

The subject matter described herein relates generally to methods and systems for controlling a rotor of a wind turbine, and more particularly, to methods and systems for controlling rotors of wind turbines in a wind farm.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Wind turbines are typically equipped with measurement systems and control systems to enable them to independently react to changing wind conditions. These systems are designed to maximize energy capture while minimizing the impact of fatigue and extreme loads. Typically, measurement systems and detectors of or local to the wind turbine operate in a reaction mode, reacting to conditions already existing at the wind turbine.

Upstream turbines of a wind farm produce a wake that is characterized by a region of reduced velocity and increased turbulence. Any wind turbines of the wind farm operating downstream in wake conditions will experience higher fatigue loads and lower power capture than expected according to the ambient wind velocity conditions.

It would therefore be desirable to provide systems and methods that minimize turbulence effects and in particular the wake effects created by an upstream turbine on a downstream turbine.

BRIEF DESCRIPTION OF THE INVENTION

In one aspect, a method for operating a wind turbine is provided. The method includes determining a wind condition, determining for the wind condition expected azimuthal positions of a rotating wind rotor of the wind turbine, and determining for the wind condition desired azimuthal positions of the rotating wind rotor so that at least one of a load balance of the rotating wind rotor and a power uptake of the rotating wind rotor is improved compared to the expected azimuthal positions.

In another aspect, a method for operating a wind farm is provided. The method includes estimating a time variation of an air velocity profile in a rotor plane defined by a rotor blade of a wind rotor of a first wind turbine, and adjusting a time variation of an azimuthal position of the wind rotor with respect to the time variation of the air velocity profile.

In yet another aspect, a wind turbine is provided. The wind turbine includes a rotor including a rotor axis and a rotor blade; and a control system. The control system includes an azimuthal position sensing system which is configured to determine an actual value of an azimuthal position of the rotor with respect to the rotor axis and to control the azimuthal position during normal operation of the wind turbine.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system with a wind rotor and a control system which is configured to control the azimuthal position of the wind rotor during normal operation of the wind turbine. Accordingly, a load balance of the rotating wind rotor and/or a power uptake of the rotating wind rotor may be improved. More specifically, a time variation of an air velocity profile in the rotor plane of the rotating wind rotor is estimated by the control system and a time variation of an azimuthal position of the rotating wind rotor is adjusted to the time variation of the air velocity profile. Accordingly, a wake interaction between wind turbines of a wind farm may be reduced and thus the overall load balance and/or overall power uptake of the wind farm may be improved.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "normal operation" intends to describe an operating mode of the wind turbine in which kinetic energy of wind is converted to electrical power.

Figure 1:
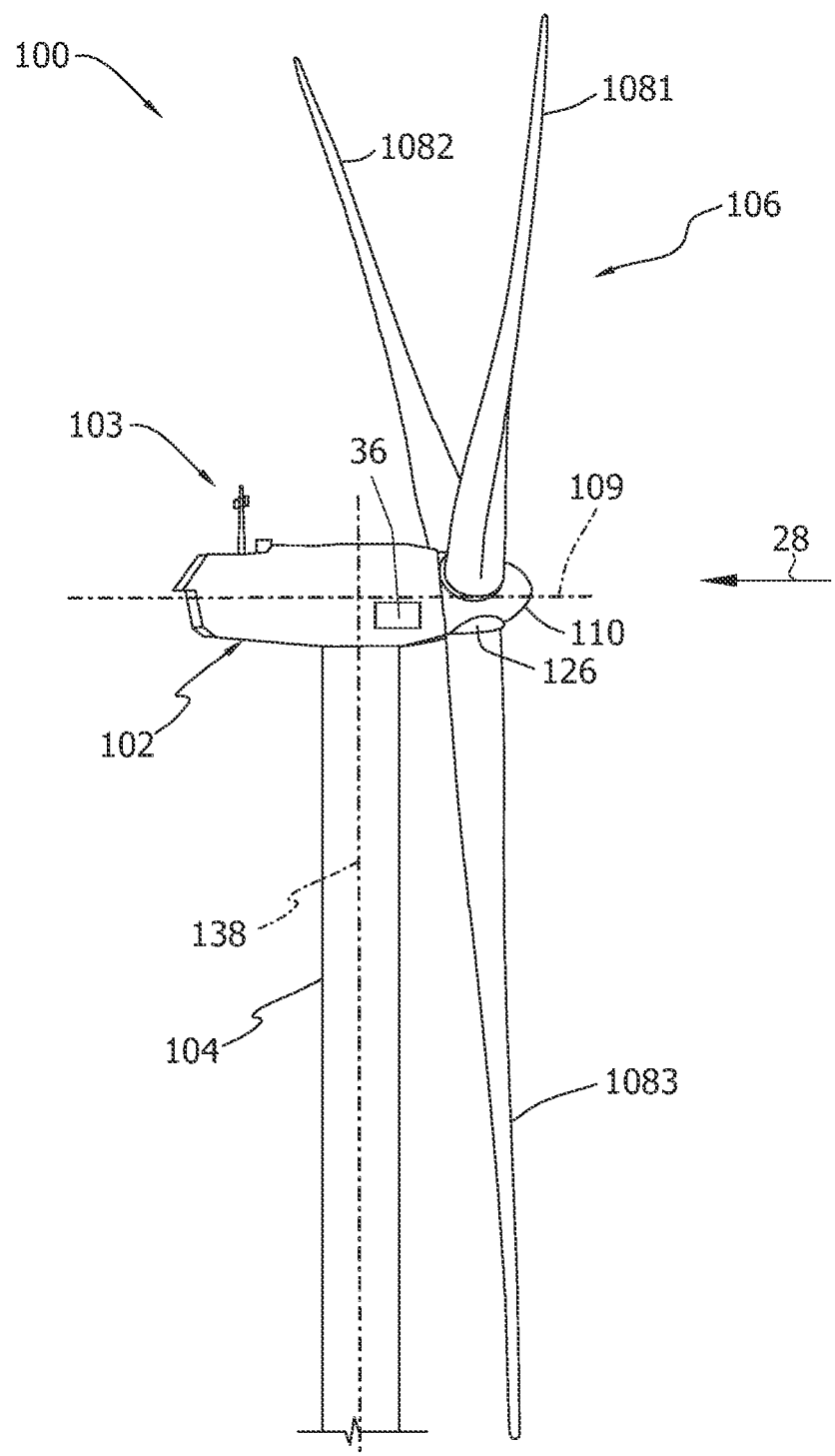
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 1081, 1082, 1083 attached to a rotating hub 110. Alternatively, wind turbine 100 includes any number of blades that facilitates operation of wind turbine 100 as described herein. In the following a rotor with one or more rotor blades is also referred to as a wind rotor. In the exemplary embodiment, wind turbine 100 includes a gearbox (not shown in FIG. 1) operatively coupled to rotor 106 and a generator (not shown in FIG. 1).

In one embodiment, rotor blades 1081, 1082, 1083 have a length ranging from about 15 meters (m) to about 91 m. Alternatively, rotor blades 1081, 1082, 1083 may have any suitable length that enables wind turbine 10 to function as described herein. For example, other non-limiting examples of blade lengths include 10 m or less, 20 m, 37 m, or a length that is greater than 91 m. As wind strikes rotor blades 1081, 1082, 1083 from a direction 28, rotor 106 is rotated about an axis of rotation 109. As rotor blades 1081, 1082, 1083 are rotated and subjected to centrifugal forces, rotor blades 1081, 1082, 1083 are also subjected to various forces and moments. As such, rotor blades 1081, 1082, 1083 may deflect and/or rotate from a neutral, or non-deflected, position to a deflected position.

Moreover, a pitch angle or blade pitch of rotor blades 1081, 1082, 1083, i.e., an angle that determines a perspective of rotor blades 1081, 1082, 1083 with respect to direction 28 of the wind, may be changed by a pitch adjustment system 32 to control the load and power generated by wind turbine 100 by adjusting an angular position of at least one rotor blade 1081, 1082, 1083 relative to wind vectors. During operation of wind turbine 10, pitch adjustment system 32 may change a blade pitch of rotor blades 1081, 1082, 1083 such that rotor blades 1081, 1082, 1083 are moved to a feathered position, such that the perspective of at least one rotor blade 1081, 1082, 1083 relative to wind vectors provides a minimal surface area of rotor blade 1081, 1082, 1083 to be oriented towards the wind vectors, which facilitates reducing a rotational speed of rotor 106 and/or facilitates a stall of rotor 106.

In the exemplary embodiment, a blade pitch of each rotor blade 1081, 1082, 1083 is controlled individually by a control system 36. Alternatively, the blade pitch for all rotor blades 1081, 1082, 1083 may be controlled simultaneously by control system 36. Further, in the exemplary embodiment, as direction 28 changes, a yaw direction of nacelle 102 may be controlled about a yaw axis 138 to position rotor blades 1081, 1082, 1083 and rotor 106, respectively, with respect to direction 28.

Nacelle 102 typically also includes at least one meteorological mast 113 that includes a wind vane and anemometer (neither shown in FIG. 1). Mast 113 provides information to control system 36 that may include wind direction and/or wind speed.

Figure 2:
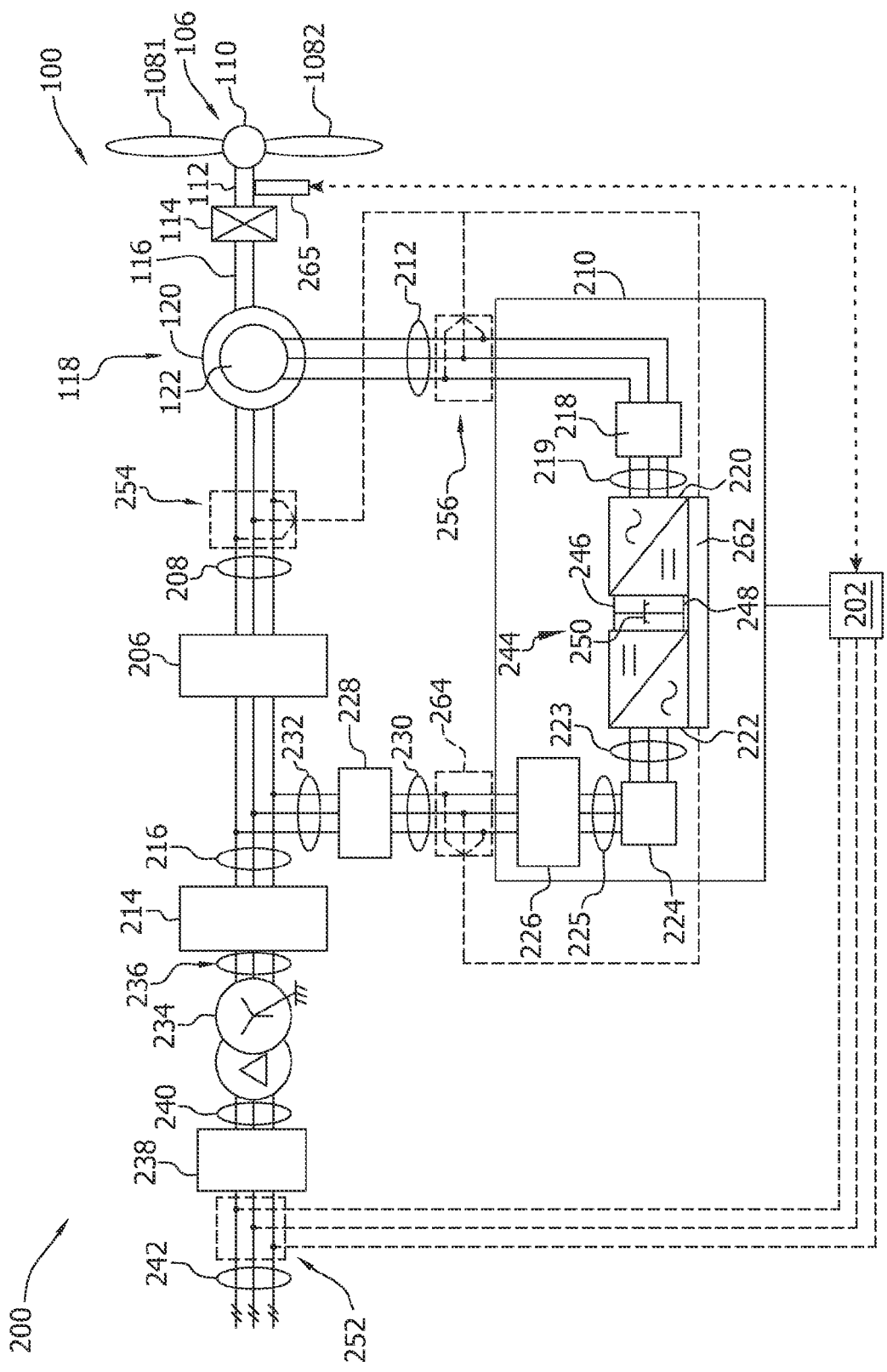
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 1081, 1082 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 1081, 1082 and blades 1081, 1082 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. In the exemplary embodiment, an encoder 265 connected to low-speed shaft 112 or high speed shaft 116 may be used to measure a rotational speed and/or an angular position of the respective shaft and rotor 106, respectively.

High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 1081, 1082. Therefore, in this manner, mechanical and electrical rotor frequencies are decoupled from stator frequency. Accordingly, generator 118 is a variable speed generator.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
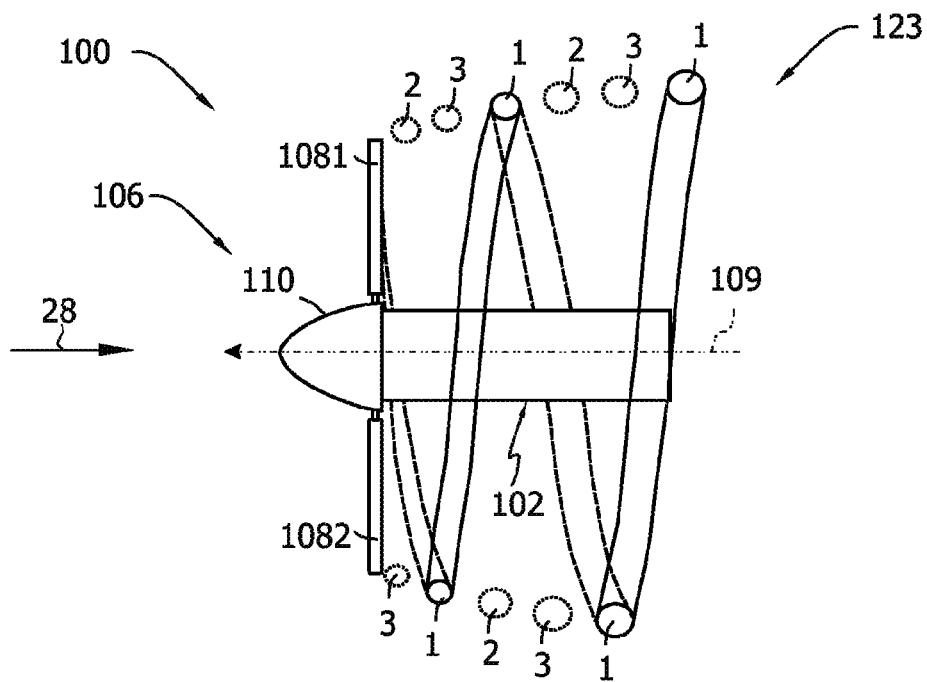
FIG. 3 illustrates a vortex generated by the wind turbine shown in FIG. 1.

FIG. 3 illustrates an air flow generated by an operating wind turbine 100 as explained above with regard to FIGS. 1 and 2. For sake of clarity, only nacelle 102 and wind rotor 106 are shown in FIG. 3. In the exemplary embodiment, wind rotor 106 includes a hub 110 and three rotor blades 1081, 1082. However, only two of the three rotor blades 1081, 1082 are shown in the schematic side view on wind turbine 100 in FIG. 3. The rotor blades 1081, 1082 rotate about rotor axis 109 which is substantially parallel, at least with respect to horizontal orientation, to external wind direction 28. The rotating rotor blades 1081, 1082 define a rotor plane and wind rotor plane, respectively. The diameter of the wind rotor plane is, at least for larger rotor blades 1081, 1082, about two times the extension of the rotor blades 1081, 1082 in a direction which is radial with respect to rotor axis 109, i.e. in radial direction.

Due to power uptake of wind rotor 106 during normal operation of wind turbine 100, the speed of air flow is reduced behind wind turbine 100, for example to about a third of air flow speed in front of wind turbine 100. Furthermore, a complex vortex 123 made of three entwined helical blade-tip vortices 1, 2, 3 is formed downstream wind rotor 106. This is due to the air counteracting the blade torque and in part to aerodynamic effects which are related to the finite size of the rotor blades 1081, 1082. For sake of clarity, only the blade-tip vortex 1 originating from the tip of rotor blade 1081 is completely shown. The vortices 2, 3 originating from the other two rotor blades are only illustrates as dotted circles in a vertical plane including rotor axis 109. As a consequence, a turbulent wake field is formed downstream wind turbine 100. Depending on the blade torque coefficient and the tip-speed ratio of the rotor blades 1081, 1082, the wake field may extend downstream up to about three times or even up to about seven times the diameter of the wind rotor plane. Accordingly, the wake field of a wind turbine may not only reduce power uptake of a downstream wind turbine in a wind farm but also increase turbulent loads on the wind rotor of the downstream wind turbine. Note that the wake field typically extends up to about three diameters of the wind rotor plane in a horizontal radial direction.

Figure 4:
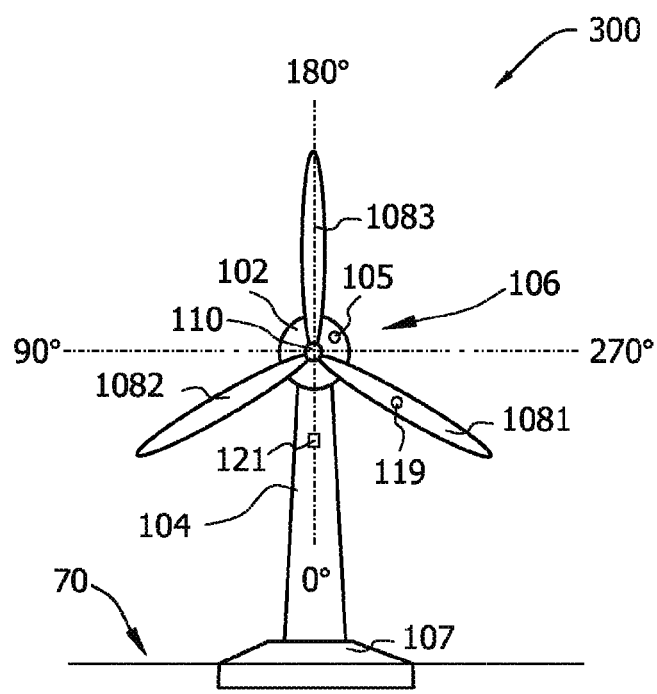
FIG. 4 is a front view of a wind turbine according to an embodiment.

FIG. 4 is a front view of a wind turbine 300, i.e. a view on wind turbine 300 in wind direction. Wind turbine 300 is similar to wind turbine 100 explained above with regard to FIGS. 1 to 3. In the exemplary embodiment, wind turbine 300 also includes a wind rotor 106 with three rotor blades 1081, 1082, 1083. Accordingly, wind turbine 300 also typically produces a downstream wake field as explained above with regard to FIG. 3.

FIG. 4 additionally shows as an exemplary foundation 107 to anchor tower 104 of wind turbine 300 on ground 70. Wind turbine 300 may, however, also be an off-shore wind turbine.

During normal operation, wind rotor 106 rotates about the rotor axis and thus the azimuthal positions of the rotor blades 1081, 1082, 1083 with respect to the rotor axis vary. The azimuthal position of wind rotor 106 may be defined by an azimuthal position of one of its rotor blades 1081, 1082, 1083. In the exemplary embodiment illustrated in FIG. 4, an azimuthal position of 0° corresponds to a position of wind rotor 106 in which the tip of rotor blade 1081 is at lowest possible vertical position. This is however only an example.

According to an embodiment, wind turbine 300 includes a control system with an azimuthal position sensing system which is configured to determine an actual value of an azimuthal position of wind rotor 106. Accordingly, the azimuthal position of wind rotor 106 may be monitored during normal operation of wind turbine 300.

Furthermore, the control system is typically configured to control the azimuthal positions during normal operation of wind turbine 300. Accordingly, the time course of the azimuthal position may be changed during normal operation in order to reduce a load acting on wind rotor 109 and/or to increase the power uptake of wind rotor 106, for example in the event of a turbulence.

In the exemplary embodiment, a transponder 119 which is connected with rotor blade 1081 of wind rotor 106 and a receiver 121 in or at tower 104 is used for measuring the actual azimuthal position of wind rotor 106. On movement of blade 1081, transponder 119 induces a response in receiver 221. Such a response in receiver 216 generates an electronic signal (not shown) that is substantially representative of an azimuthal position of rotor blade 1081 and rotor 106, respectively. That signal is transmitted to a processor (not shown) which receives the electronic signal. The processor is typically programmed to determine the azimuthal position of rotor 106 as a function of time in a substantially continuous manner.

Alternatively or in addition, the azimuthal position sensing system includes an acceleration sensor connected with wind rotor 106, an electronic spirit level detector arranged in wind rotor 106 and/or an encoder connected to a shaft of a drive-train which is configured to transmit a torque between wind rotor 106 and a generator of wind turbine 300. For example, a shaft encoder (not shown) may be coupled to a high speed shaft and/or a low speed shaft at or near gear box similar as shown in FIG. 2. Such a shaft encoder may be an electro-mechanical device that senses an angular position of at least a portion of the shaft and generates an analog or digital signal substantially representative of such angular position.

According to an embodiment, wind turbine 100 includes a wind detecting system configured to determine a wind condition. The wind detecting system may include an anemometer. Typically, wind detecting system is configured to detect an upstream turbulence of the wind. For example, the wind detecting system may include a LIDAR-system (Light Detection And Ranging) 105 for measuring an upstream air velocity profile.

According to an embodiment, the control system is configured to determine desired azimuthal positions of wind rotor 106 so that a load on the wind rotor is reduced and/or a power uptake of wind rotor 106 is increased at the wind condition. Typically, the control system is configured to estimate a time variation of a velocity profile of an upstream vortex in the wind rotor plane and to adjust the azimuthal positions of wind rotor 106 with respect to the time variation of the velocity profile. Accordingly, a load acting on wind rotor 106 may be reduced or at least better balanced and/or a power uptake of wind rotor 106 may be increased.

Typically, the azimuthal positions of wind rotor 106 are adjusted by changing the speed of wind rotor 106. For example, the control system may determine an appropriate torque set-point, or a sequence of torque set-points, for a variable speed generator connected with wind rotor 106 and issue this torque set-point to the generator so that the azimuthal positions of the rotor approach the desired azimuthal positions.

Alternatively or in addition, the control system is configured to determine a set-point for the pitch angle so that the azimuthal positions of the rotor approach the desired azimuthal positions.

Figure 5:
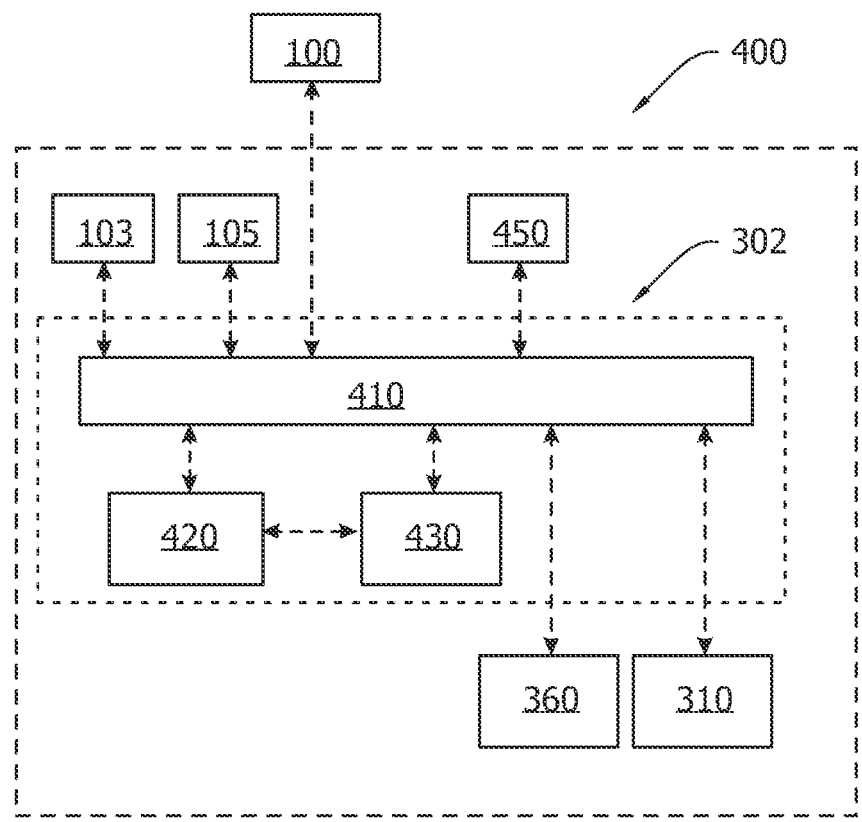
FIG. 5 is a schematic view of a control system of a wind turbine according to an embodiment.

FIG. 5 is a schematic view of a control system 400 that may be used for controlling wind turbine 300 explained above with regard to FIG. 2.

According to an embodiment, control system 400 includes a control module 430, a simulation module 420 and an interface 410. As indicated by dashed arrows, control module 430 and simulation module 420 may communicate with each other via interface 410 and/or directly. Typically, a main turbine controller 302 of wind turbine 300 may provide the control module 430, the simulation module 420 and the interface 410.

Typically, control system 400 includes an azimuthal position sensing system 450 which is configured to determine an actual value of the azimuthal position of the wind rotor and to transmit the actual value of the azimuthal position to interface 410.

Typically, control system 400 further includes a wind detecting system which is configured to determine a wind condition and to transmit the wind condition to interface 410. The wind detecting system may include an anemometer 103 and/or a detecting system which is configured to detect an upstream wind turbulence, more typically to measure the wind velocity profile such as a LIDAR-system 105.

Control system 400 is typically configured to determine desired azimuthal positions of wind rotor 106, for example a time course of desired azimuthal positions, so that a load on the wind rotor is reduced and/or a power uptake of the wind rotor is increased at the wind condition. For example, simulation module 420 uses the wind condition as an input of a turbulent wind model to calculate the desired azimuthal positions.

Simulation module 420 is typically also configured to calculate set-points for pitch system 360 and/or a power conversion assembly 310, for example a generator, of the wind turbine such that the wind rotor operates at the desired azimuthal positions or at least approaches the desired azimuthal positions. These set-points are typically issued by control module 430, which operates a primary controller of the wind turbine, to pitch system 360 and power conversion assembly 310, respectively.

According to an embodiment, simulation module 420 is configured to estimate a wake influence of an upstream wind turbine on the wind rotor. For example, interface 410 may be connected to a further wind turbine 100 and configured to receive an operational status of the further wind turbine 100. In this embodiment, simulation module 420 typically uses the operational status as a further input to determine the desired azimuthal positions. The operational status of the further wind turbine may include a speed of a wind rotor of the further wind turbine 100, an azimuthal position of the wind rotor of the further wind turbine 100, a yaw angle of the wind rotor of the further wind turbine 100 and/or a sequence of one or more of theses values.

Figure 6:
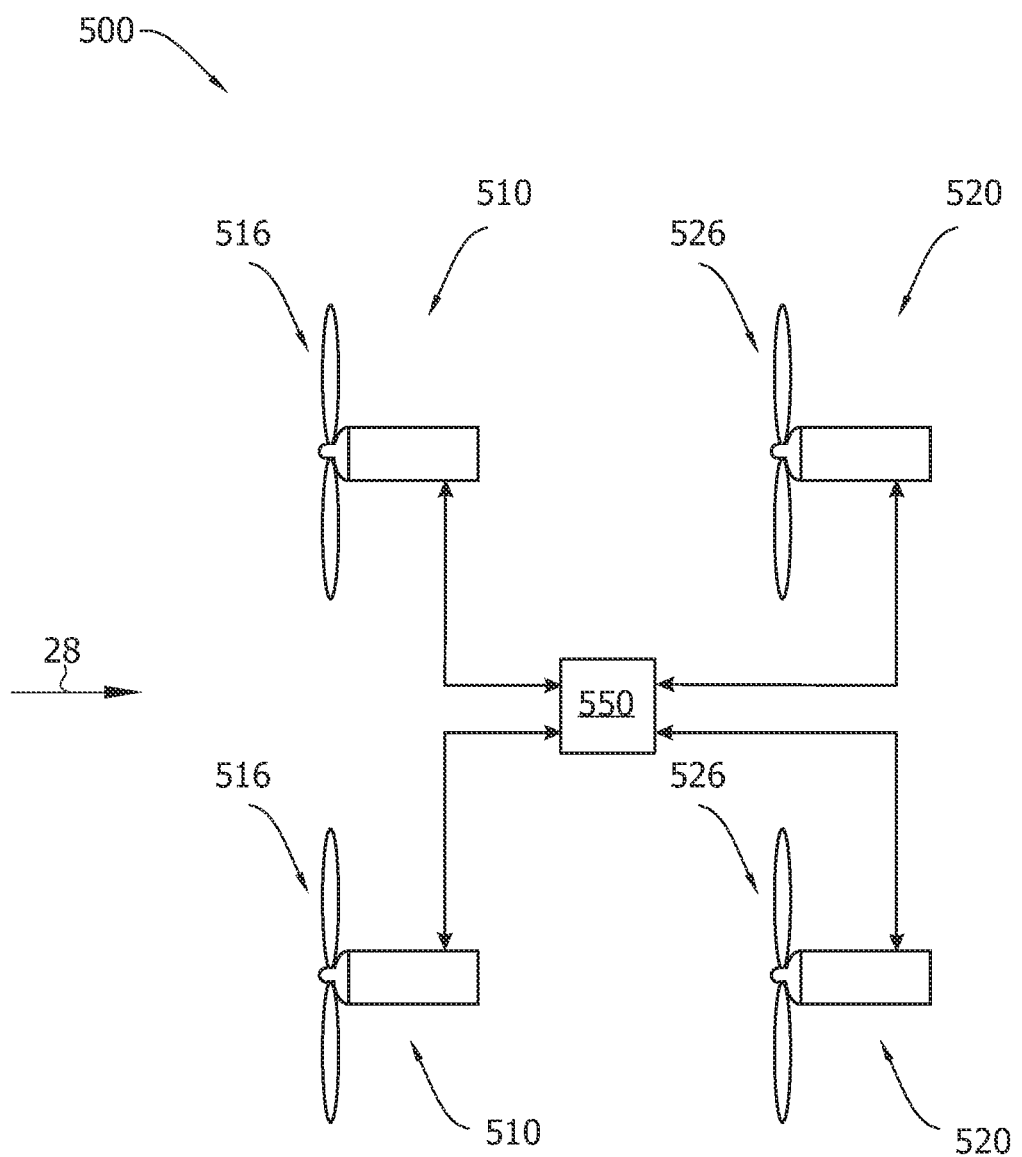
FIG. 6 is a schematic view of a wind farm according to an embodiment.

FIG. 6 is a schematic view of a wind farm 500. Wind farm 500 includes upstream wind turbines 510 with respective wind rotors 516 and downstream wind turbine 520 with respective wind rotors 526. Each of the upstream wind turbines 510 and downstream wind turbine 520 may be a wind turbine as explained above with regard to FIGS. 4 and 5.

In the exemplary embodiment, wind farm 500 includes a control system 550 which is coupled to the upstream wind turbines 510 and configured to receive at least one of a respective speed of the wind rotors 516, a respective azimuthal position of the wind rotors 516, pitch angles of rotor blades of the wind rotors 516 and a respective yaw angle of the wind rotors 516, and to control the azimuthal position of the wind rotors 526 of the downstream wind turbines 520 during normal operation of the downstream wind turbine 520. This is indicated by arrows in FIG. 6.

Typically, control system 550 is configured to estimate a wake influence of the upstream wind turbine 510 on the rotors 526 of the downstream wind turbines 520 at given wind condition which is typically measured by a wind detecting system (not shown in FIG. 6). The wind detecting system may be provides by the wind turbines 510, 520 and typically includes a LIDAR-system.

According to an embodiment, control system 550 may be configured to determine desired azimuthal positions for the wind rotor 526 of the downstream wind turbine so that a wake influence of the upstream wind turbines 510 on the wind rotors 526 is reduced. Accordingly, a load of the wind rotors 526 may be reduced and or an overall power production of wind farm 500 may be increased.

According to an embodiment, control system 550 is also configured to control the azimuthal positions of the wind rotors 516 of upstream wind turbines 510 to even further increase the overall power production of wind farm 500.

Figure 7:
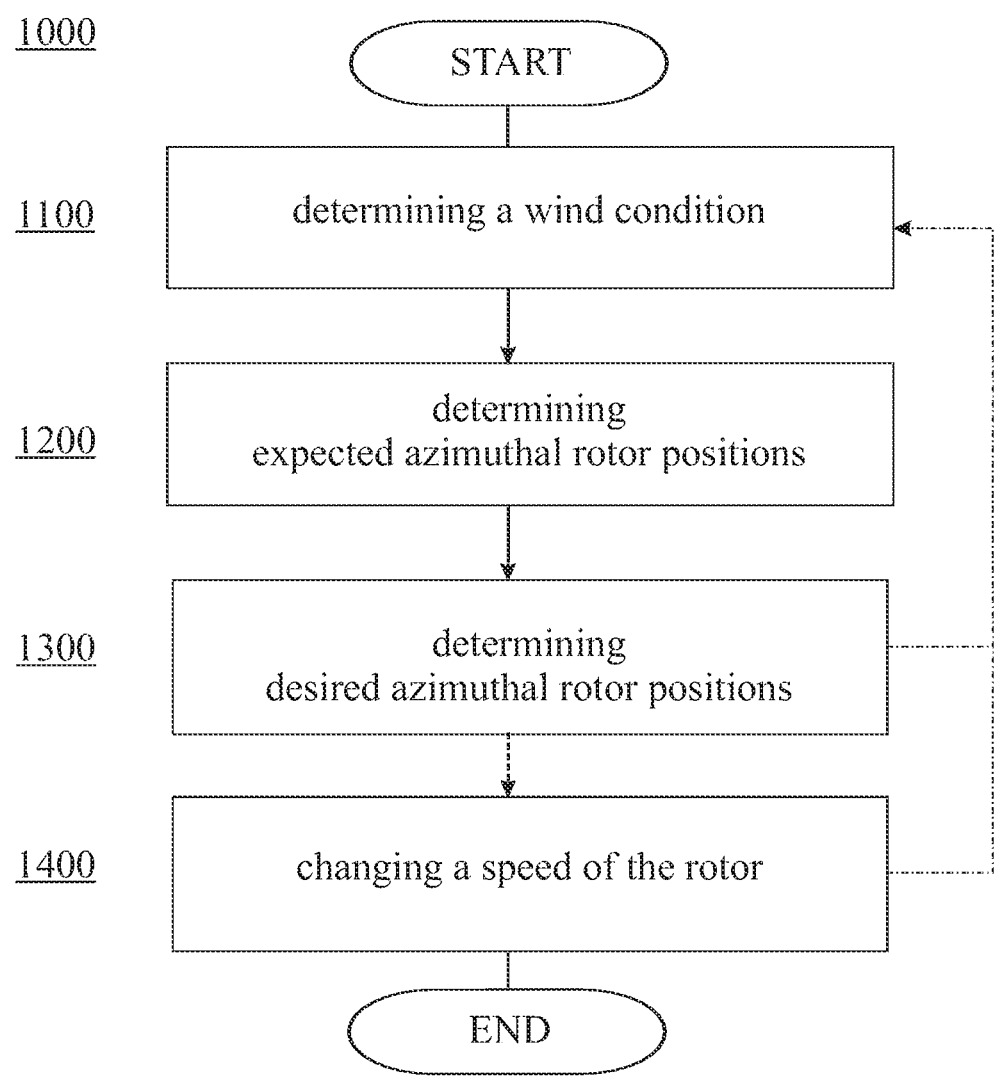
FIG. 7 illustrates a flow diagram of a method for operating a wind turbine according to an embodiment.

FIG. 7 is a flow diagram of a method 1000 for operating a wind turbine, for example a wind turbine as explained above with regard to FIGS. 4 and 5. In a first block 1100, a wind condition is determined Determining the wind condition typically includes measuring a wind speed and a wind direction of an upstream airflow. More typically, determining the wind condition further includes measuring a velocity profile of the upstream airflow. For example, a LIDAR-system may be used to measure the velocity profile of the upstream airflow. Accordingly, a turbulence in the upstream air flow may be detected in advance. This turbulence may be due to ambient wind variations and/or due to the interaction of ambient wind with one or more upstream wind turbines.

In a block 1200, expected azimuthal positions of a rotating wind rotor of the wind turbine, typically a time curve of the azimuthal positions of the rotating wind rotor, is determined The expected azimuthal positions are typically determined for the current wind turbine settings and wind condition using a model.

In a block 1300, it is tried to determine desired azimuthal positions of the rotating wind rotor so that at least one of a load balance of the rotating wind rotor and a power uptake of the rotating wind rotor is improved compared to the expected azimuthal positions.

Determining the desired azimuthal positions typically includes determining a time variation of a velocity profile of the upstream air flow, for example an upstream vortex, in a rotor plane defined by a rotor blade of the wind rotor and adjusting the desired azimuthal positions of the wind rotor with respect to the time variation of the velocity profile. For this purpose, a model of the wind turbine and a turbulent wind model are typically used. For example, a wake influence of an upstream wind turbine on the rotating wind rotor may be determined in a simulation. Determining the wake influence typically includes determining a speed of a wind rotor of the upstream wind turbine, determining an azimuthal position of the wind rotor of the upstream wind turbine, determining pitch angles of rotor blades attached to the wind rotor of the upstream wind turbine and determining a yaw angle of the wind rotor of the upstream wind turbine.

During the simulation, updated wind conditions and/or status information of the wind turbine, such as the actual azimuthal wind rotor position, the actual power production, the actual torque, the actual pitch angles and the actual yaw angle may be taken into account.

If the desired azimuthal positions substantially match the expected azimuthal positions, method 1000 typically returns to block 1100 as indicated by the dashed-dotted arrow. Otherwise, the speed of the rotating wind rotor is changed in a block 1400 so that the azimuthal positions of the rotating wind rotor approaches the desired azimuthal positions. Accordingly, the azimuthal positions of the rotating wind rotor are better adjusted with respect to the wind condition. Thus, a load balance and/or a power uptake of the rotating wind rotor may be improved.

Thereafter, method 1000 typically returns to block 1100 to close-loop control the azimuthal wind rotor positions, as indicated by the dashed-dotted arrow.

Changing the speed of the rotating wind rotor may include changing a pitch angle of a rotor blade of the wind rotor, changing a torque of a generator of the wind turbine, and changing a power production of the generator.

Figure 8:
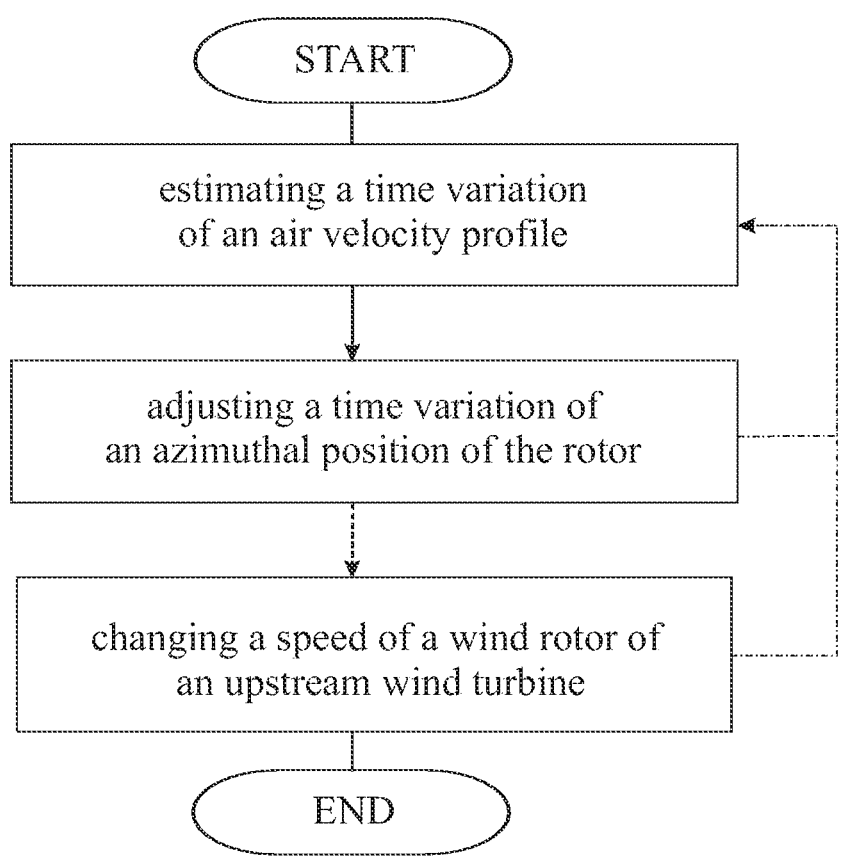
FIG. 8 illustrates a flow diagram of a method for operating a wind farm according to an embodiment.

FIG. 8 is a flow diagram of a method 2000 for operating a wind farm, for example a wind farm as explained above with regard to FIG. 6.

In a block 2200, a time variation of an air velocity profile in a rotor plane defined by a rotor blade of a wind rotor of a first wind turbine of the wind farm is estimated. This typically includes measuring an upstream air velocity profile, for example using a LIDAR system. Further, a model is typically used to determine the air velocity profile in the rotor plane using the upstream air velocity profile and the actual wind turbine settings as inputs.

If the first wind turbine is a downstream wind turbine, estimating the time variation of the air velocity profile may includes using a speed of a wind rotor of an upstream wind turbine as an input of the model, using an azimuthal position of the wind rotor of the upstream wind turbine as an input of the model, using a yaw angle of the wind rotor of the upstream wind turbine as an input of the model, and/or using a pitch angle of a rotor blade attached to the wind rotor of the upstream wind turbine as an input of the model. The model typically includes a turbulent wind model. Accordingly, a wake influence of the upstream wind turbine on the wind rotor may be estimated with sufficient accuracy.

In a block 2200, a time variation of the azimuthal position of the rotor of the first wind turbine is adjusted with respect to the time variation of the air velocity profile. Accordingly, a load balance and/or a power uptake of the rotating wind rotor may be improved. This typically includes determining expected azimuthal rotor positions, desired azimuthal rotor positions, and changing a speed of the rotor of the first wind turbine as explained above with regard to FIG. 6.

If the first wind turbine is a downstream wind turbine, a speed of a wind rotor of an upstream wind turbine may be changed in a block 2500 so that at least one of a load balance of the wind rotor and a power uptake of the wind rotor of the downstream wind turbine and the wind farm, respectively, is improved compared to independently operating the upstream wind turbine.

Typically, method 2000 is closed-loop controlling the wind farm as indicated by the dashed-dotted arrows.

Furthermore, method 2000 without optional block 2500 may also be used to control a single wind turbine. Accordingly, a load balance and/or a power uptake of the rotating wind rotor may be improved in the event of a turbulence in the upstream air flow.

The above-described systems and methods facilitate improving load balance and/or power uptake of the rotating wind rotor by controlling the azimuthal wind rotor positions with respect to expected time variation of an air velocity profile. More specifically, a wake influence of an upstream wind turbine on the rotating wind rotor of a downstream wind turbine of a wind from may be reduced. Thus the overall power production and/or the life time of wind turbine components may be increased.

Exemplary embodiments of systems and methods for operating a wind turbine and a wind farm are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, comprising:
    determining a wind condition;
    determining, for the wind condition, expected azimuthal positions of a rotating wind rotor with respect to a rotor axis of the wind turbine;
    determining, for the wind condition, desired azimuthal positions of the rotating wind rotor with respect to the rotor axis so that at least one of a load balance of the rotating wind rotor and a power uptake of the rotating wind rotor is improved compared to the expected azimuthal positions; and
    issuing a change in speed of the rotating wind rotor so that expected azimuthal positions of the rotating wind rotor with respect to the rotor axis approach the desired azimuthal positions.

2. The method of claim 1, wherein determining the desired azimuthal positions comprises at least one of:
    determining a time variation of a velocity profile of an upstream vortex in a rotor plane defined by a rotor blade of the rotating wind rotor;
    adjusting the desired azimuthal positions of the rotating wind rotor with respect to the time variation of the velocity profile; and,
    estimating a wake influence of an upstream wind turbine on the rotating wind rotor.

3. The method of claim 2, wherein estimating a wake influence comprises at least one of determining a speed of a wind rotor of the upstream wind turbine, determining an azimuthal position of the wind rotor of the upstream wind turbine, and determining a yaw angle of the wind rotor of the upstream wind turbine.

4. The method of claim 1, wherein changing the speed of the rotating wind rotor comprises at least one of changing a pitch angle of a rotor blade of the rotating wind rotor and changing a torque of a generator of the wind turbine.

5. A method for operating a wind farm, comprising:
    estimating a time variation of an air velocity profile in a rotor plane defined by a rotor blade of a wind rotor of a first wind turbine;
    determining, for the estimated time variation, expected azimuthal positions of a rotating wind rotor with respect to the rotor axis of the first wind turbine;
    determining, for the estimated time variation, desired azimuthal positions of the rotating wind rotor with respect to the rotor axis according to a time variation of a velocity profile of an upstream airflow so that at least one of a load balance of the rotating wind rotor and a power uptake of the rotating wind rotor is improved compared to the expected azimuthal positions; and issuing a change in speed of the rotating wind rotor so that expected azimuthal positions of the rotating wind rotor with respect to the rotor axis approach the desired azimuthal positions.

6. The method of claim 5, wherein estimating the time variation of the air velocity profile comprises measuring an upstream air velocity profile.

7. The method of claim 5, wherein the first wind turbine is a downstream wind turbine of the wind farm, and wherein estimating the time variation of the air velocity profile comprises at least one of:

using a speed of a wind rotor of an upstream wind turbine as an input of a wind model including turbulence;

using an azimuthal position of the wind rotor of the upstream wind turbine as an input of the wind model;

using a yaw angle of the wind rotor of the upstream wind turbine as an input of the wind model; and, estimating a wake influence of the upstream wind turbine on the wind rotor.

8. The method of claim 5, wherein the first wind turbine is a downstream wind turbine of the wind farm, further comprising changing a speed of a wind rotor of an upstream wind turbine so that at least one of a load balance of the wind rotor and a power uptake of the wind rotor of the downstream wind turbine is improved compared to independently operating the upstream wind turbine.

9. A wind turbine, comprising:

a rotor comprising a rotor axis and a rotor blade;

a control system comprising an azimuthal position sensing system for determining an actual value of an azimuthal position of the rotor with respect to the rotor axis, wherein the control system is further configured to:

determine a wind condition, determine, for the wind condition, expected azimuthal positions of the rotor with respect to a rotor axis of the wind turbine, determine, for the wind condition, desired azimuthal positions of the rotor with respect to the rotor axis so that at least one of a load balance of the rotor and a power uptake of the rotor is improved compared to the expected azimuthal positions, and issue a change in speed of the rotor so that expected azimuthal positions of the rotor with respect to the rotor axis approach the desired azimuthal positions.

10. The wind turbine of claim 9, wherein the control system is configured to estimate a time variation of a velocity profile of an upstream vortex in a rotor plane defined by the rotor blade and to adjust the azimuthal positions of the rotor with respect to the time variation of the velocity profile.

11. The wind turbine of claim 9, wherein the control system further comprises a wind detecting system for determining the wind condition, wherein the control system is configured to determine the desired azimuthal positions using the wind condition.

12. The wind turbine of claim 11, wherein the wind detecting system is configured to detect an upstream turbulence of the wind.

13. The wind turbine of claim 12, wherein the control system further comprises a simulation module for calculating the desired azimuthal positions using a wind model which includes turbulence.

14. The wind turbine of claim 13, wherein the simulation module estimates a wake influence of an upstream wind turbine on the rotor.

15. The wind turbine of claim 11, further comprising an interface connected to a further wind turbine and configured to transmit an operational status of the further wind turbine to the control system, wherein the control system is configured to use the operational status as a further input to determine the desired azimuthal positions.

16. The wind turbine of claim 15, wherein the operational status of the further wind turbine comprises at least one of a speed of a wind rotor of the further wind turbine, an azimuthal position of the wind rotor of the further wind turbine, and a yaw angle of the wind rotor of the further wind turbine.

17. The wind turbine of claim 11, further comprising a variable speed generator connected with the rotor, wherein the control system is configured to determine a set-point for the generator so that azimuthal positions of the rotor approach the desired azimuthal positions.

18. The wind turbine of claim 17, wherein the azimuthal position sensing system comprises at least one of an encoder connected to a shaft which is configured to transmit a torque between the rotor and the generator of the wind turbine, an acceleration sensor connected with the rotor, an electronic spirit level detector arranged in the rotor, and a transponder connected with the rotor and a receiver arranged outside the rotor.

19. The wind turbine of claim 11, further comprising a pitch system for adjusting a pitch angle of the at least one rotor blade, wherein the control system is configured to determine a set-point for the pitch angle so that azimuthal positions of the rotor approach the desired azimuthal positions.

* * * * *